US008492923B2

(12) United States Patent
Horng et al.

(10) Patent No.: US 8,492,923 B2
(45) Date of Patent: Jul. 23, 2013

(54) LAMP CIRCUIT WITH SIMPLIFIED CIRCUITRY COMPLEXITY

(75) Inventors: Alex Horng, Kaohsiung (TW); Chi-Hung Kuo, Kaohsiung (TW); Chung-Ken Cheng, Kaohsiung (TW); Chieh-Feng Lee, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 225 days.

(21) Appl. No.: 12/769,804

(22) Filed: Apr. 29, 2010

(65) Prior Publication Data

US 2011/0101776 A1 May 5, 2011

(30) Foreign Application Priority Data

Nov. 2, 2009 (TW) .............................. 98137119 A

(51) Int. Cl.

| | |
|---|---|
| ***H02J 1/00*** | (2006.01) |
| ***G05F 1/00*** | (2006.01) |
| ***H05B 37/02*** | (2006.01) |

(52) U.S. Cl.
USPC ............. 307/31; 307/36; 250/484.2; 315/291

(58) Field of Classification Search
None
See application file for complete search history.

(56) References Cited

U.S. PATENT DOCUMENTS

| | | | | |
|---|---|---|---|---|
| 4,560,909 | A * | 12/1985 | Peil | 315/291 |
| 4,743,809 | A | 5/1988 | Vlahos | |
| 5,034,659 | A | 7/1991 | Taniguchi | |
| 7,692,908 | B2 * | 4/2010 | Chen et al. | 361/82 |
| 8,076,920 | B1 * | 12/2011 | Melanson | 323/299 |
| 2005/0253532 | A1 * | 11/2005 | Villarin | 315/185 R |
| 2007/0132401 | A1 * | 6/2007 | Gawrys et al. | 315/274 |
| 2008/0224636 | A1 * | 9/2008 | Melanson | 315/307 |

FOREIGN PATENT DOCUMENTS

| | | |
|---|---|---|
| JP | 4370901 | 6/2005 |
| JP | 4752213 | 3/2006 |
| JP | 4093239 | 8/2006 |
| JP | 2007-265790 A | 10/2007 |
| JP | 2009-009817 A | 1/2009 |

* cited by examiner

*Primary Examiner* — Hal Kaplan
(74) *Attorney, Agent, or Firm* — Muncy, Geissler, Olds & Lowe, PLLC

(57) ABSTRACT

A lamp circuit is disclosed, comprising a direct current (DC) power supplier adapted to provide a supply voltage, a driving unit coupled to the DC power supplier so as to receive the supply voltage, and a light-radiating module coupled to the driving unit and having a DC output side. The driving unit generates a constant DC current that passes through the light-radiating module such that a DC voltage to be supplied to a DC load is built at the DC output side.

13 Claims, 3 Drawing Sheets

LAMP CIRCUIT WITH SIMPLIFIED CIRCUITRY COMPLEXITY

BACKGROUND OF THE INVENTION

1. Field of the Invention

The present invention generally relates to a lamp circuit and, more particularly, to a lamp circuit that supplies a voltage to a load based on a received voltage from a light-radiating module thereof.

2. Description of the Related Art

Conventional lamps generally comprise a light-radiating module which radiates light through light-radiating devices such as light-emitting diodes (LEDs), bulbs or light tubes. Since the light-radiating module generates a significant amount of heat during operations, cooling equipments such as fans or heat sinks are required for cooling the light-radiating module in order to prolong the service life of the lamp.

Apart from a load of the light-radiating module, the conventional lamps also comprise a direct current (DC) load. Generally, the DC load requires different supply voltage from the light-radiating module. Therefore, multiple supply voltages are irreversibly required in the lamps.

Referring to FIG. 1, a conventional lamp circuit is disclosed. The lamp circuit comprises a DC power supply 91, a driving unit 92 and a light-radiating module 93. The DC power supply 91 is electrically connected to the driving unit 92 which, in turn, is electrically connected to the light-radiating module 93. The DC power supply 91 generates a first voltage V91 that is provided to the driving unit 92. The driving unit 92 generates a constant DC current Ic that passes through the light-radiating module 93. With the constant DC current Ic, the light luminance of the light-radiating module 93 is kept in a constant level. The light-radiating module 93 comprises a feedback end 931 electrically connected to the driving unit 92. The light-radiating module 93 sends a feedback signal back to the driving unit 92 via the feedback end 931 such that the driving unit 92 may keep the constant DC current Ic passing through the light-radiating module 93 from varying based on the variation of the feedback signal.

A cooling fan 95 is required to be equipped in the lamp for cooling purpose as the light-radiating module 93 generates a significant amount of heat due to the constant DC current Ic passing therethrough. Since the cooling fan 95 requires different supply voltage from the light-radiating module 93, an additional supply voltage has to be provided therefor.

Referring to FIG. 1, the lamp circuit further comprises a voltage regulation unit 94 electrically connected to the driving unit 92 to receive a DC voltage therefrom. Alternatively, the voltage regulation unit 94 may also be electrically connected to the output ends of the DC power supply 91 to receive a first voltage V91. The voltage regulation unit 94 converts the first voltage V91 into a second voltage V92 that is provided to the cooling fan 95.

The conventional lamp circuit has some drawbacks. For instance, the conventional lamp circuit requires the voltage regulation unit 94 for providing the second voltage V92 to the cooling fan 95. In this regard, circuitry complexity and costs are increased.

Therefore, it is desired to improve the conventional lamp circuit.

SUMMARY OF THE INVENTION

It is therefore the primary objective of this invention to provide a lamp circuit which simplifies the circuitry complexity and reduces the costs by avoiding extra components used.

It is another objective of this invention to provide a lamp circuit which has more functions and simplifies the circuit complexity of the feedback circuit.

It is another objective of this invention to provide a lamp circuit which requires smaller volume of a transformer by using a micro-controller unit.

The invention discloses a lamp circuit, comprising a direct current (DC) power supplier adapted to provide a supply voltage, a driving unit coupled to the DC power supplier so as to receive the supply voltage, and a light-radiating module coupled to the driving unit and having a DC output side. The driving unit generates a constant DC current that passes through the light-radiating module such that a DC voltage to be supplied to a DC load is built at the DC output side.

BRIEF DESCRIPTION OF THE DRAWINGS

The present invention will become more fully understood from the detailed description given hereinafter and the accompanying drawings which are given by way of illustration only, and thus are not limitative of the present invention, and wherein.

Figure 1:
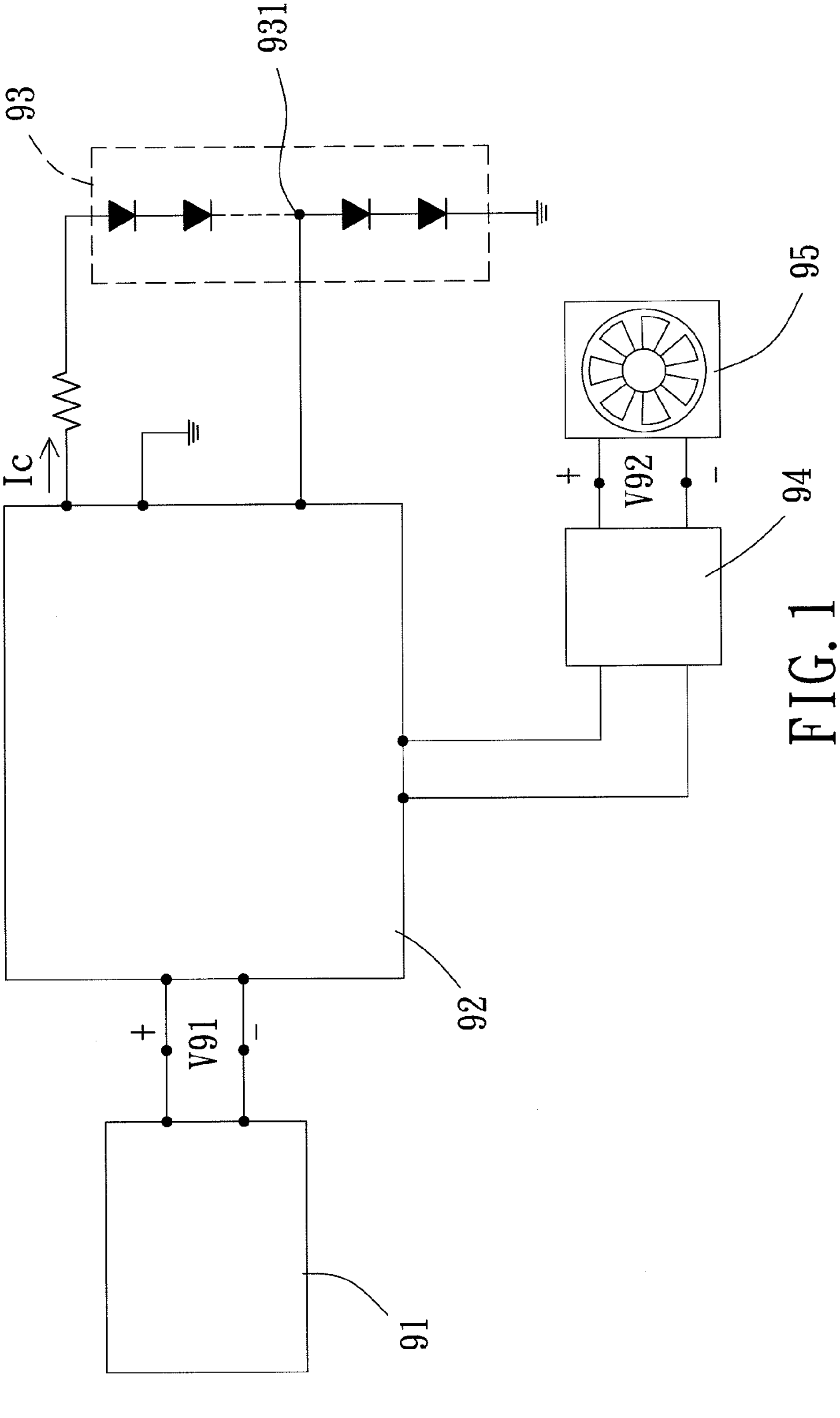
FIG. 1 PRIOR ART
FIG. 1 shows a conventional lamp circuit.

In the various figures of the drawings, the same numerals designate the same or similar parts. Furthermore, when the term "first", "second", "third", "fourth", "inner", "outer" "top", "bottom" and similar terms are used hereinafter, it should be understood that these terms are reference only to the structure shown in the drawings as it would appear to a person viewing the drawings and are utilized only to facilitate describing the invention.

DETAILED DESCRIPTION OF THE INVENTION

Figure 2:
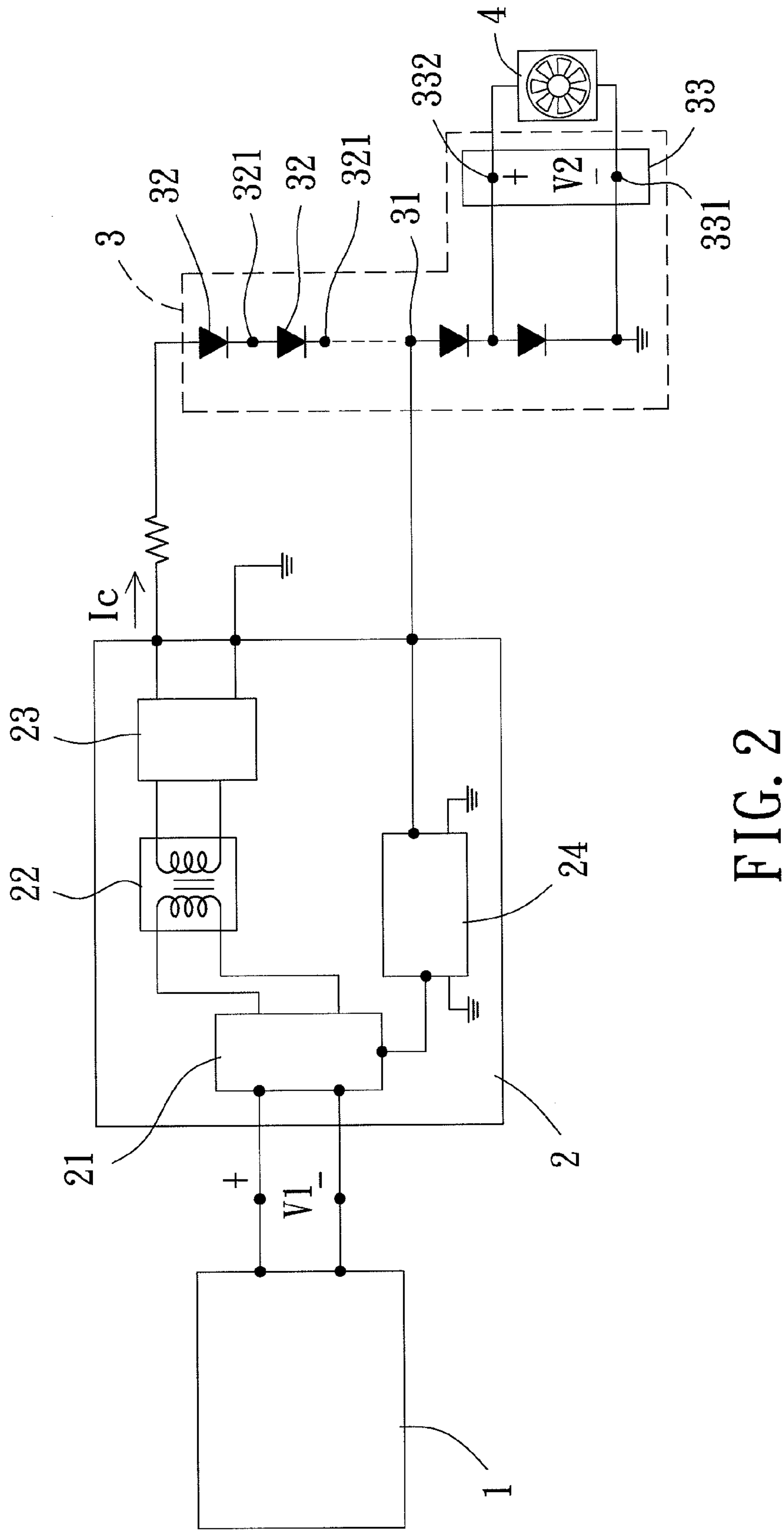
FIG. 2 shows a lamp circuit according to a first embodiment of the invention.

Referring to FIG. 2, a lamp circuit is disclosed according to a first embodiment of the invention. The lamp circuit comprises a DC power supply 1, a driving unit 2 and a light-radiating module 3. The DC power supply 1 is electrically connected to the driving unit 2 which, in turn, is electrically connected to the light-radiating module 3. The DC power supply 1 receives an external supply voltage (not shown) and processes the received supply voltage with a series of procedures to generates a supply voltage V1 at an output side thereof, such as voltage dropping, rectifying and voltage regulation and so on. The supply voltage V1 is provided to the driving unit 2. The driving unit 2 generates a constant DC current Ic that passes through the light-radiating module 3. The constant DC current Ic is kept from varying such that the light luminance of the light-radiating module 3 is kept in a constant level.

The driving unit 2 is an independent unit which ensures the operation of the lamp circuit by separating the control loop and power loop. The driving unit 2 comprises a switching unit 21, a transformer 22, a rectifying and filtering element 23 and a feedback unit 24. The switching unit 21 is connected to the DC power supply 1. A primary side of the transformer 22 is electrically connected to the switching unit 21 and a secondary side of the transformer 22 is electrically connected to the rectifying and filtering element 23. The rectifying and filtering element 23 has an output end electrically connected to the light-radiating module 3.

The switching unit 21 receives the supply voltage V1 and generates a first pulse to be received at the primary side of the transformer 22. The transformer 22 converts the first pulse into a second pulse at the secondary side thereof. The second pulse is sent to the rectifying and filtering element 23 which, in turn, converts the second pulse into the constant DC current Ic. Note that by adjusting the turn ratio between the primary side and the secondary side, the voltage ratio and current ratio between the first pulse and the second pulse may be designed based on power consumption and power characteristic of a load (not shown).

To prevent the constant DC current Ic from varying, the light-radiating module 3 comprises a feedback end 31 electrically connected to the feedback unit 24 of the driving unit 2. The feedback end 31 sends a feedback signal to the feedback unit 24 of the driving unit 2. Based on the feedback signal, the driving unit 2 keeps the constant DC current Ic from varying so as to keep the light luminance of the light-radiating module 3 in a constant level.

Referring to FIG. 2 again, the light-radiating module 3 in the first embodiment of the invention comprises a plurality of light-radiating elements 32 and a DC output side 33. The light-radiating elements 32 are connected in series, with a connection node 321 being formed between two series-connected light-radiating elements 32. In FIG. 2, at least one connection node 321 is formed.

The DC output side 33 of the light-radiating module 3 is electrically connected to a DC load 4 so that the DC output side 33 may provide a DC voltage V2 to the DC load 4. The DC load 4 may be a cooling fan or DC motor. The DC output side 33 has a first connection end 331 and a second connection end 332. The first connection end 331 is electrically connected to ground and the second connection end 332 is electrically connected to one of the connection nodes 321.

Specifically, since each light-radiating element 32 has an internal resistance, the DC voltage V2 is established at a connection node 321 when the constant DC the current Ic passes through the light-radiating module 3. Each connection node 321 has different voltage with respect to ground. The second connection end 332 of the DC output side 33 may be connected to a proper connection node 321 according to the voltage requirement of the DC load 4. In this way, a proper voltage (i.e. DC voltage V2 shown in FIG. 2) may be provided to the DC load 4 by the light-radiating module 3 through the DC output side 33.

Figure 3:
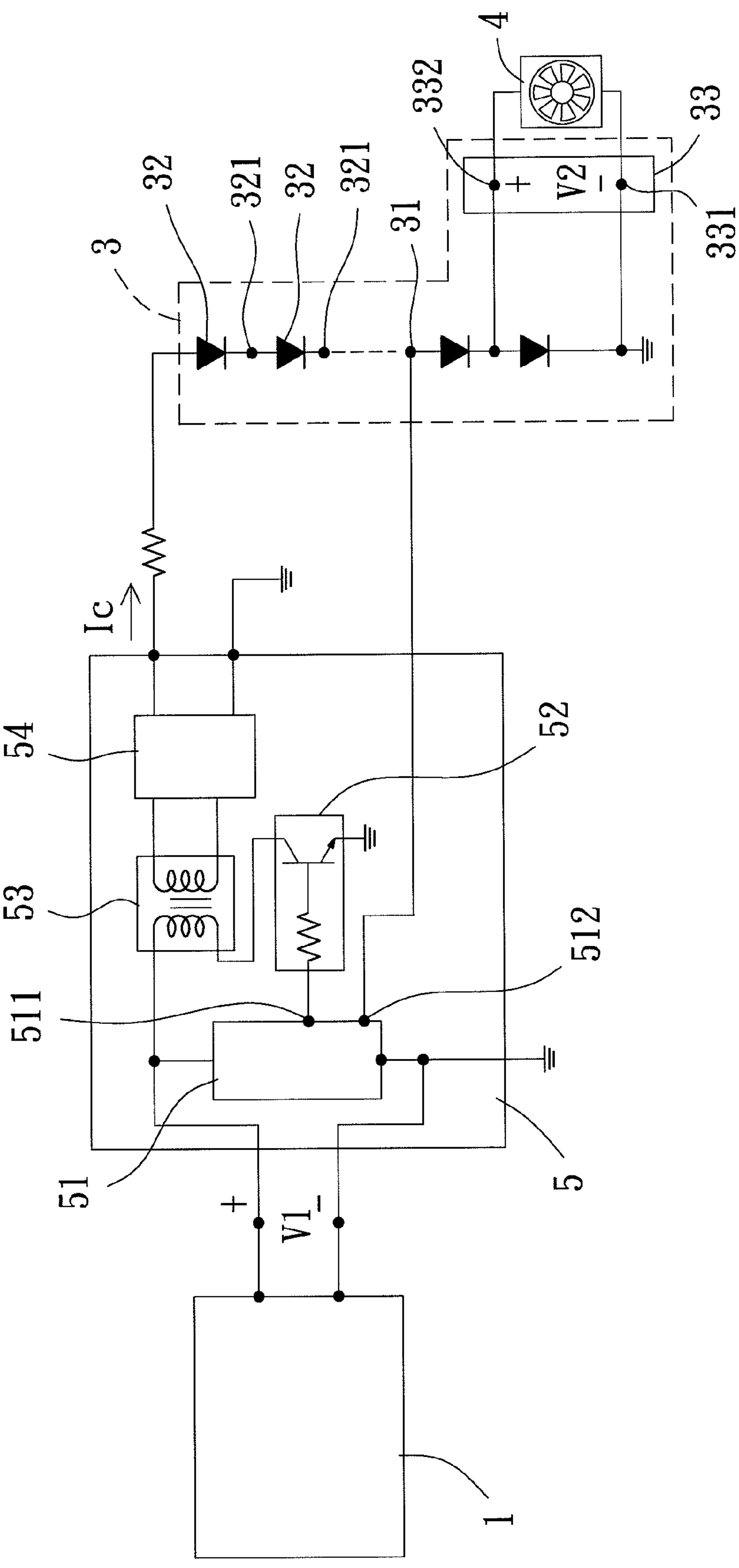
FIG. 3 shows a lamp circuit according to a second embodiment of the invention.

Referring to FIG. 3, a lamp circuit is disclosed according to a second embodiment of the invention. In comparison with the first embodiment, a digital driving unit 5 is provided in the second embodiment. The digital driving unit 5 comprises a micro-controller unit (MCU) 51, an electronic switch 52, a transformer 53 and a rectifying and filtering element 54. The MCU 51 is electrically connected to the DC power supply 1 so as to receive the supply voltage V1 therefrom. The electronic switch 52 is electrically connected to a control end 511 of the MCU 51 such that a control signal, that is used to control the ON/OFF operation of the electronic switch 52, may be sent to the electronic switch 52 via the control end 511. A primary side of the transformer 53 is electrically connected to the electronic switch 52 and a secondary side of the transformer 53 is electrically connected to the rectifying and filtering element 54. The rectifying and filtering element 54 is electrically connected to the light-radiating module 3. A first pulse is generated at the primary side of the transformer 53 during switching operation of the electronic switch 52. A second pulse is generated at the secondary side of the transformer 53. The rectifying and filtering element 54 generates and outputs the constant DC current Ic to the light-radiating module 3. The electronic switch 52 may be a transistor switch.

The MCU 51 in the second embodiment further comprises a feedback signal receiving end 512 electrically connected to the feedback end 31 of the light-radiating module 3. Upon receipt of the feedback signal from the feedback end 31, the MCU 51 may control the digital driving unit 5 to output the constant DC current Ic.

Specifically, the light-radiating module 3 in the second embodiment may also output the DC voltage V2 to the DC load 4 via the DC output side 33 thereof. Since the DC load 4 and the DC output side 33 are connected in parallel, a portion of the constant DC current Ic will be shared by the DC load 4, resulting in a variation of the feedback signal. In response thereto, the feedback signal receiving end 512 increases or reduces the magnitude of the outputted DC current thereof based on the variation of the feedback signal in order to prevent the constant DC current Ic from varying.

In comparison with the independent driving unit 2 in the first embodiment, the digital driving unit 5 has advantages such as reducing the costs as well as circuit complexity of feedback circuit. Furthermore, since the digital driving unit 5 is not operated under large currents, a small-volume transformer 53 may be used. In another embodiment, the MCU 51 in the second embodiment may comprise an additional control end electrically connected to an input end of the DC load 4. For example, assume that the DC load 4 is a cooling fan; the MCU 51 may send a rotation speed control signal to the cooling fan via the input end of the cooling fan. In this way, the rotational speed of the cooling fan may be controlled. Based on this, by using the MCU 51, more functions may be implemented in the lamp circuit without using complex rotation speed control circuit.

To achieve high circuit integrity, the digital driving unit 5 (or some components of the digital driving unit 5 such as the MCU 51) may be mounted on a circuit board in the cooling fan.

In conclusion, the invention provides the DC voltage V2 to the DC load 4 through the light-radiating module 3 without using an extra voltage regulation unit 94. Thus, costs are reduced and circuit complexity is simplified.

Although the invention has been described in detail with reference to its presently preferable embodiment, it will be understood by one of ordinary skill in the art that various modifications can be made without departing from the spirit and the scope of the invention, as set forth in the appended claims.

What is claimed is:

1. A lamp circuit, comprising:

a direct current (DC) power supplier adapted to provide a supply voltage;

a driving unit coupled to the DC power supplier so as to receive the supply voltage and to generate a constant DC current; and a light-radiating module-coupled to the driving unit for the constant DC current to pass through and having a DC output side wherein the DC output side is electrically coupled to a DC load in parallel and a DC voltage is built at the DC output side by the constant DC current, wherein the driving unit comprises:

a switching unit coupled to the DC power supplier;

a transformer having a primary side and a secondary side, wherein the primary side is coupled to the switching unit;

a rectifying and filtering element coupled to the secondary side of the transformer, generating the constant DC current, and having an output end coupled to and sending the constant DC current to the light-radiating module; and a feedback unit coupled to the switching unit and the light-radiating module.

2. The lamp circuit as claimed in claim 1, wherein the light-radiating module comprises a plurality of light-radiating elements connected in series.

3. The lamp circuit as claimed in claim 2, wherein the light-radiating module further comprises at least one connection node where two of the light-radiating elements are connected in series.

4. The lamp circuit as claimed in claim 3, wherein the DC output side has a first connection end and a second connection end, the first connection is connected to ground and the second connection end is connected to one of the at least one connection node.

5. The lamp circuit as claimed in claim 1, wherein the light-radiating module has a feedback end coupled to the feedback unit of the driving unit.

6. A lamp circuit, comprising:

a direct current (DC) power supplier adapted to provide a supply voltage;

a driving unit coupled to the DC power supplier so as to receive the supply voltage and to generate a constant DC current; and a light-radiating module-coupled to the driving unit for the constant DC current to pass through and having a DC output side wherein the DC output side is electrically coupled to a DC load in parallel and a DC voltage is built at the DC output side by the constant DC current, wherein the driving unit comprises:

a micro-controller unit (MCU) coupled to the DC power supplier;

an electronic switch coupled to the MCU;

a transformer having a primary side and a secondary side, wherein the primary side is coupled to the electronic switch; and a rectifying and filtering element coupled to the secondary side of the transformer, generating the constant DC current, and having an output end coupled to and sending the constant DC current to the light-radiating module,

7. The lamp circuit as claimed in claim 6, wherein the electronic switch is a transistor switch.

8. The lamp circuit as claimed in claim 6, wherein the MCU comprises a feedback signal receiving end coupled to a feedback end of the light-radiating module.

9. The lamp circuit as claimed in claim 6, wherein the MCU comprises an additional control end coupled to an input end of the DC load.

10. The lamp circuit as claimed in claim 6, wherein the DC load is a cooling fan or DC motor.

11. The lamp circuit as claimed in claim 6, wherein the light-radiating module comprises a plurality of light-radiating elements connected in series.

12. The lamp circuit as claimed in claim 11, wherein the light-radiating module further comprises at least one connection node where two of the light-radiating elements are connected in series.

13. The lamp circuit as claimed in claim 12, wherein the DC output side has a first connection end and a second connection end, the first connection is connected to ground and the second connection end is connected to one of the at least one connection node.

* * * * *